United States Patent [19]

Takeda et al.

[11] Patent Number: 4,903,257

[45] Date of Patent: Feb. 20, 1990

[54] DIGITAL TWO-WAY RADIO-COMMUNICATION SYSTEM USING SINGLE FREQUENCY

[75] Inventors: Yukio Takeda, Zama; Takeshi Takano, Ushiku; Yoshiaki Kaneko, Yokohama; Akihiko Kimura; Takaharu Nakamura, both of Urawa, all of Japan

[73] Assignee: Fujitsu Limited, Kawasaki, Japan

[21] Appl. No.: 199,703

[22] Filed: May 27, 1988

[30] Foreign Application Priority Data

May 27, 1987 [JP] Japan ................................ 62-130860
Aug. 31, 1987 [JP] Japan ................................ 62-217394

[51] Int. Cl.$^4$ ........................... H04B 1/56; H04L 5/14
[52] U.S. Cl. ...................................... 370/29; 370/109; 455/83; 455/86
[58] Field of Search ...................... 375/5, 8, 9; 455/31, 455/38, 78, 83, 84, 86; 370/24, 29, 38, 39, 109

[56] References Cited

U.S. PATENT DOCUMENTS

| | | | |
|---|---|---|---|
| 2,808,504 | 10/1957 | Neumann et al. | 455/86 |
| 2,974,222 | 3/1961 | Lawson | 455/84 |
| 4,092,598 | 5/1978 | Deman et al. | 375/9 |
| 4,450,583 | 5/1984 | Strobel et al. | 455/86 |
| 4,525,835 | 6/1985 | Vance et al. | 370/29 |

Primary Examiner—Benedict V. Safourek
Attorney, Agent, or Firm—Staas & Halsey

[57] ABSTRACT

A digital two-way radio communication system including first and second radio stations. Each radio station includes an antenna, a data transmission unit, a data reception unit, and a switching circuit. Both radio stations are radio-connected by a single frequency. When a first data transmission unit transmits data to the second radio station, a first switching circuit in the first radio station forms a transmission path between the first data transmission unit and a first antenna, and a second switching circuit in the second radio station forms a reception path between a second antenna and a second data reception unit in the second radio station, or vice versa.

9 Claims, 12 Drawing Sheets

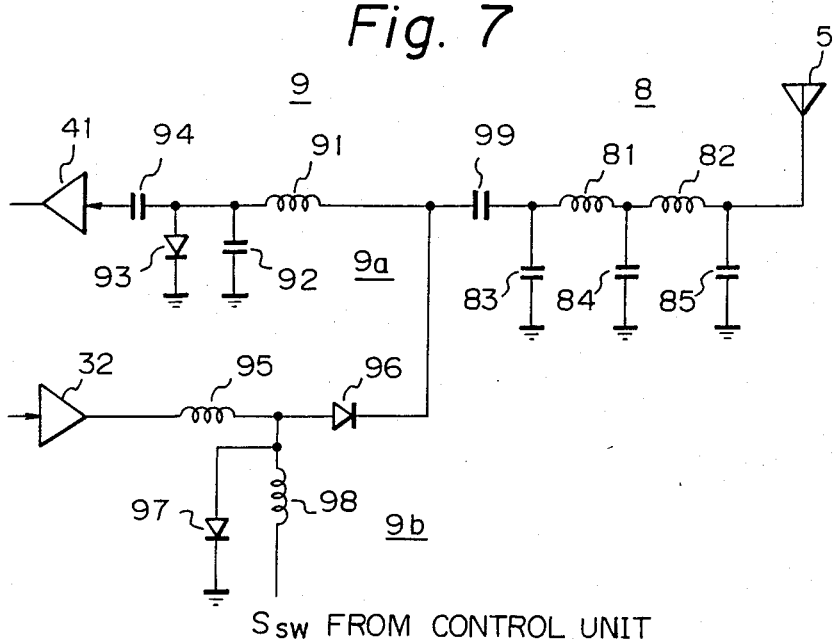
Fig. 7
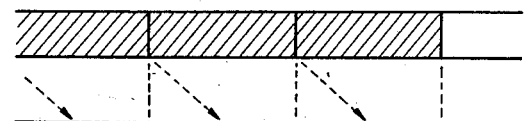
Fig. 8a S102
Fig. 8b S103
Fig. 9a S21
Fig. 9b S201

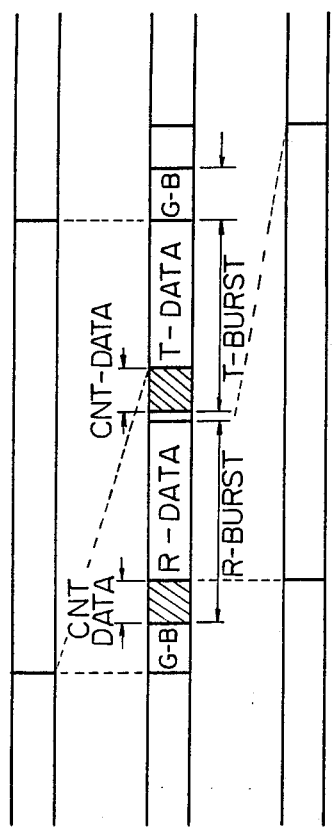
Fig. 16a S102
Fig. 16b S32 S41
Fig. 16c S114
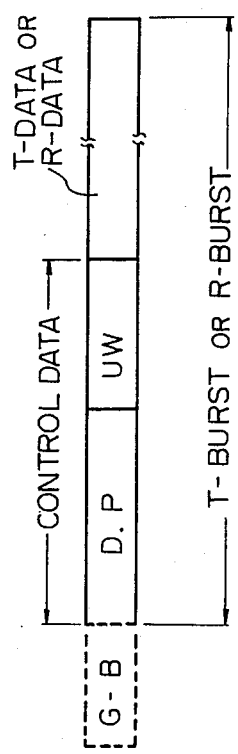
Fig. 17

DIGITAL TWO-WAY RADIO-COMMUNICATION SYSTEM USING SINGLE FREQUENCY

BACKGROUND OF THE INVENTION

1. Field of the Invention

The present invention relates to a radio-communication system. More particularly, the present invention is directed to a digital two-way radio-communication system using a single frequency.

The digital radio-communication system of the present invention is preferably applied to a mobile radio-communication system, for example, a cordless telephone system, a car telephone system, or a transceiver system.

2. Description of the Related Art

In radio-communication, two different frequencies are used to achieve two-way communication. However, this suffers from disadvantages of a need for a bulky transmission and reception bandpass filter, and the provision of an electromagnetic shield between a transmitter and a receiver in a radio-communication set. This will be described in more detail later with reference to the drawings.

SUMMARY OF THE INVENTION

An object of the present invention is to provide a digital two-way radio communication system in which a radio-communication set can be formed having a reduced size and at a low cost.

According to the present invention, there is provided a digital two-way radio communication system including a first radio station including having a first antenna, a first data transmission unit, a first data reception unit, and a first switching circuit provided among the first antenna. The first data transmission unit and the first data reception unit form a first transmission path between the first data transmission unit and the first antenna, or a first reception path between the first antenna and the first data reception unit; a second radio station is provided including a second antenna, a second data transmission unit, a second data reception unit, and a second switching circuit provided among the second antenna. The second data transmission unit and the second data reception unit form a second transmission path between the second data transmission unit and the second antenna, or a second reception path between the second antenna and the second data reception unit.

The first and second radio stations are radio-connected through the first and second antennas by using a single frequency.

When the first data transmission unit transmits data to the second radio station through the first antenna, the first switching circuit forms the first transmission path, and the second switching circuit forms the second reception path. Conversely, when the second data transmission unit transmits data to the first radio station through the second antenna, the second switching circuit forms the second transmission path, and the first switching circuit forms the first reception path.

BRIEF DESCRIPTION OF THE DRAWINGS

Other objects and features of the present invention will be described in detail with reference to the accompanying drawings, in which:

FIG. 7 is a circuit diagram of a switch circuit shown in FIG. 6;

FIGS. 8a and 8b are graphs of a data speed conversion in FIG. 6;

FIGS. 9a and 9b are graphs of a data speed conversion in FIG. 6;

FIG. 14 is a circuit diagram of a third embodiment of a radio station in accordance with the present invention;

FIG. 17 is a diagram of a format of a control data of FIG. 16b;

DESCRIPTION OF THE PREFERRED EMBODIMENTS

Before describing the preferred embodiments of the present invention, a prior art digital radio-communication system for two-way communication will be first described with reference to the drawings.

Figure 1:
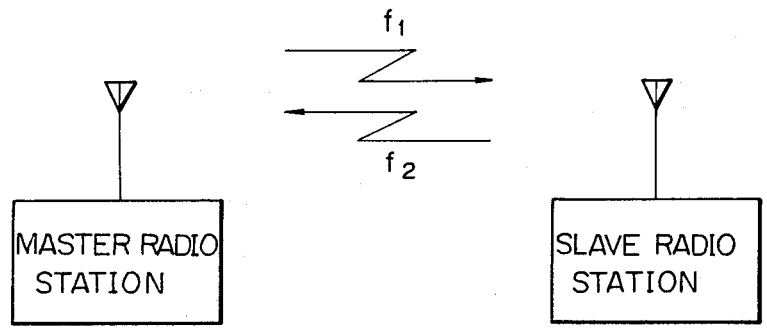
FIG. 1 is a block diagram of a prior art digital two-way radio communication system.
Figure 2:
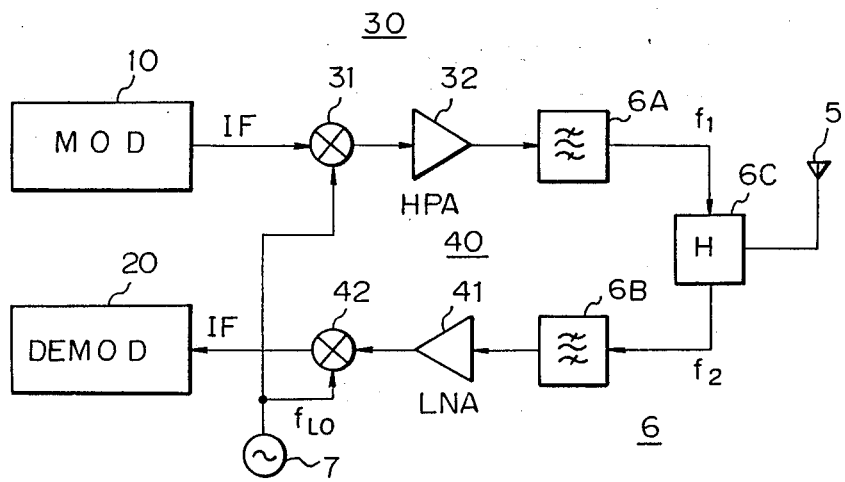
FIG. 2 is a circuit diagram of a radio station in FIG. 1.

FIG. 1 is a block diagram of a prior art digital two-way radio-communication system, such as a cordless telephone system. FIG. 2 is a circuit diagram of a master (or base) radio station, such as a base telephone portion in the cordless telephone system, and a slave radio station, such as a hand set (or portable telephone) in the cordless telephone system. Hereinafter, the cordless telephone system will be described as an example of a digital two-way radio-communication system.

In FIG. 1, the cordless telephone system consists of the base telephone portion as a master radio station, and the hand set as a slave radio station. To achieve full two-way communication two different frequencies $f_1$ and $f_2$, i.e., a frequency $f_1$ for radio-communication from the base telephone portion to the hand set, and another frequency $f_2$ for radio-communication from the hand set to the base telephone portion, are used. In FIG. 2, the base telephone portion includes a modulation unit 10, a transmission unit 30 consisting of a frequency converter 31 and a high power amplifier (HPA) 32, a transmission wave and reception wave branching unit 6, and an antenna 5. The base telephone portion also includes a reception unit 40 consisting of a low noise amplifier (LNA) 41 and a frequency converter 42, and a demodulation unit 20. A local oscillator 7 is further provided to supply a local oscillation frequency $f_{LO}$ to the frequency converters 31 and 42. At the frequency converter 31, a transmission signal having an intermediate frequency $f_{IF}$ is raised to $f_1 = f_{LO} + f_{IF}$, and at the frequency converter 42, a reception signal of a frequency $f_2$ is lowered to another intermediate frequency $f'_{IF} = f_1 - f_{LO}$.

In the wave branching unit 6, a transmission bandpass filter 6A, a hybrid circuit 6C and a reception bandpass filter 6B are provided to separate a transmission signal having a frequency $f_1$ and a reception signal having another frequency $f_2$. Since both filters 6A and 6C are passive filters, they are bulky and expensive. This bulkiness is disadvantageous in a cordless telephone system, in particular, for the hand set. Also, the high cost is a disadvantage when manufacturing a cordless telephone system.

In addition, since an output signal of the HPA 32 is high level, to eliminate the affect of noises and interference at the reception unit due to an electromagnetic force occuring in the high level output of the HPA 32 when a full two-way communication is achieved, a sufficient electromagnetic shielding must be provided between the transmission unit 30 and the reception unit 40. This shielding also increases the bulk weight, and cost of the cordless telephone system.

The problems described above with reference to the cordless telephone system may arise in other mobile radio-communication systems, such as, a transceiver system or a car telephone system, etc.

The preferred embodiments of the present invention which can overcome the above defects of the prior art radio communication system will now be described.

Figure 3:
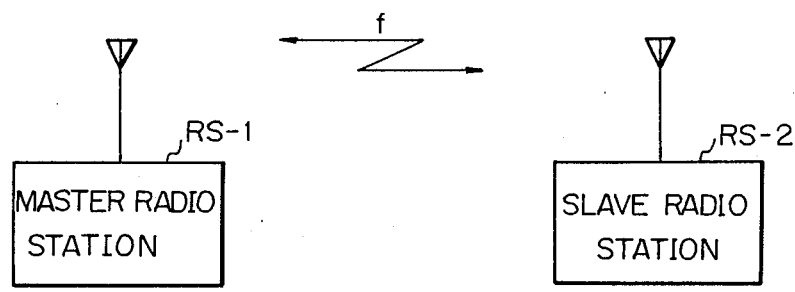
FIG. 3 is a block diagram of a digital two-way radio communication system according the present invention.
Figure 4:
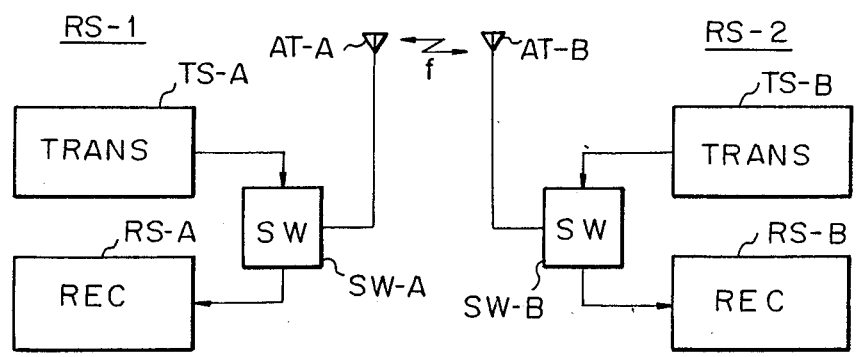
FIG. 4 is a diagram of a digital two-way radio communication system of FIG. 3.

FIG. 3 is a block diagram of a digital two-way radio-communication system of the present invention. The digital radio-communication system includes a master radio station RS-1 and a slave radio station RS-2 radio-connected to the master station. As shown in FIG. 4, the master radio station RS-1 includes a transmission system TS-A, a reception system RS-A, a switch means SW-A, and an antenna AT-A. The slave station RS-2 also includes a transmission system TS-B, a reception system RS-B, a switch means SW-B, and an antenna AT-B.

Figure 5:
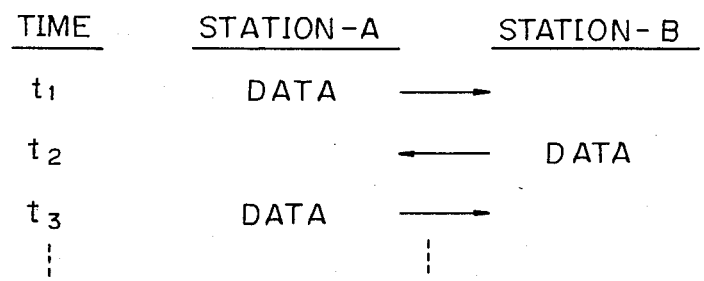
FIG. 5 is a time chart of data communication of the digital two-way radio communication system shown in FIG. 4.

The digital radio-communication system uses a single frequency f to achieve two-way communication. This two-way communication is a semi two-way communication as shown in FIG. 5, not a full two-way communication. At a time $t_1$, the master radio station RS-1 transmits data having the frequency f to the slave radio station RS-2. In response to the transmission data, at a time $t_2$, the slave radio station RS-2 transmits data having the frequency f to the master radio station RS-1. The above data transmission and reception can be consecutively carried out. To achieve the above transmission and reception, the switch means SW-A in the master radio station RS-1, passes data from the transmission system TS-A to the antenna AT-A when in a transmission mode, and, passes data from the antenna AT-A to the reception system RS-A when in a reception mode. The switch means SW-B in the slave radio station RS-2, which is in a reception mode when the master radio station is in the transmission mode, passes data received at the antenna AT-B to the reception system RS-B, or it, which is in a transmission mode when the master radio station RS-1 is in the reception mode, passes data from the reception system RS-B to the antenna AT-B. Namely, the switch means SW-A and SW-B operate in a manner reverse to each other.

In a cordless telephone system, the master radio station RS-1 corresponds to a base telephone portion, and the slave radio station RS-2 corresponds to a hand set.

Since the transmission mode and the reception mode are separated by using the switch means SW-A and SW-B, the reception systems RS-A and RS-B are not affected by high level signals of the transmission systems TS-A and TS-B. Thus, the transmission bandpass filters and reception bandpass filters described with reference to FIG. 2 can be omitted, and the electromagnetic shielding need not be provided. As a result, the digital radio-communication system can be manufactured having a compact size, a low cost, and can be formed as a fully integrated semiconductor circuit device. In addition, the usability of frequencies is expanded two fold, i.e., doubled.

Figure 6:
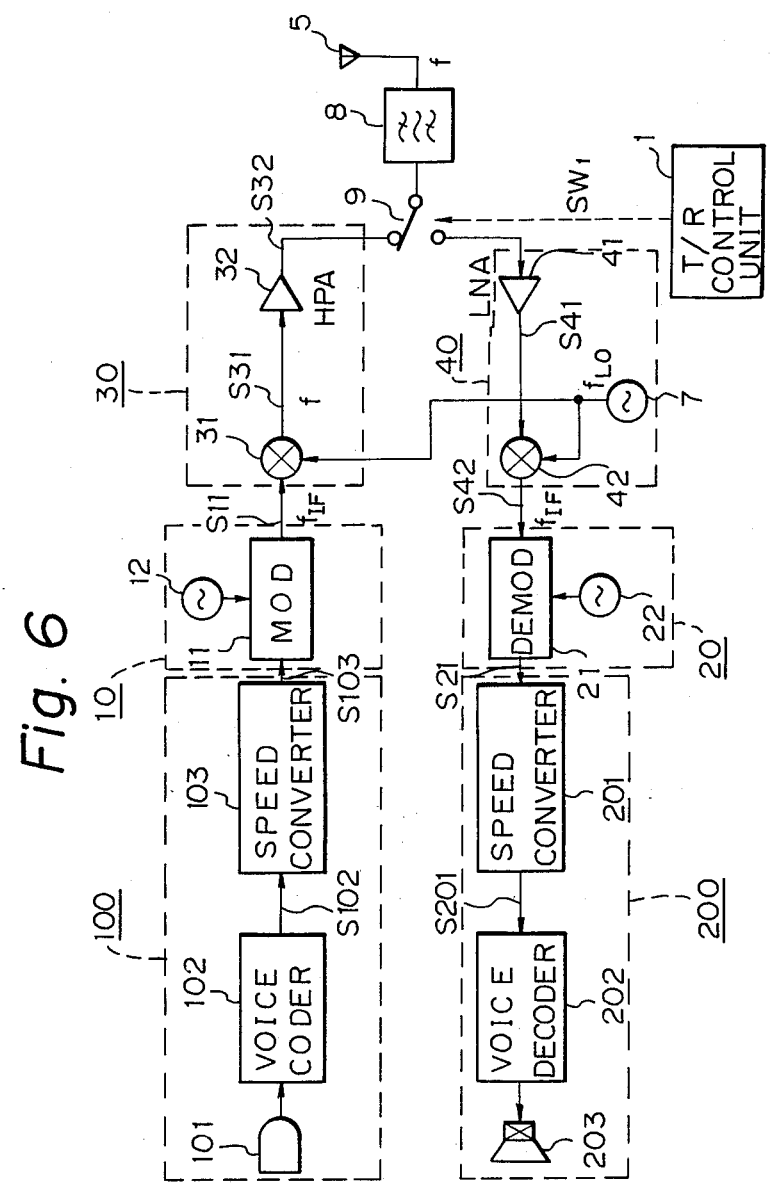
FIG. 6 is circuit diagram of a first embodiment of a radio station in FIG. 4.

FIG. 6 is a specific circuit diagram of the base telephone portion as the master radio station RS-1. The hand set as the slave radio station RS-2 also has the same circuit of the base telephone portion, and the operation thereof is similar to the operation of the base telephone portion, as described later. The only difference is that the operation timing for the transmission and the reception is the reverse of that of the base telephone portion.

In FIG. 6, the base telephone portion includes a transmission system consisting of a voice signal generation unit 100, a modulation unit 10 and a transmission unit 30, a reception system consisting of a reception unit 40, a demodulation unit 20, a voice signal reproduction unit 200, a switching circuit 9, a bandpass filter 8, an antenna 5, a transmission and reception (T/R) control unit 1, and a local oscillator (LOC) 7.

The voice signal generation unit 100 is composed of a microphone 101, a voice coder 102 which can be realized by using a CODEC 11 (coder and decoder), and a speed converter 103. The modulation unit 10 is composed of a modulator 11 and an oscillator 12. The transmission unit 30 is composed of a frequency converter 31 and a high power amplifier (HPA) 32. The reception unit 40 is composed of a low noise amplifier (LNA) 41 and a frequency converter 42. The demodulation unit 20 is composed of a demodulator 21 and an oscillator 22. The voice signal reproduction unit 200 is composed of a speed converter 201, a voice decoder 202, which can be realized by using the above CODEC, and a speaker 203.

FIG. 7 is a circuit diagram of the switching circuit 9 and the bandpass filter 8. The switching circuit 9 includes a reception side switching circuit 9a consisting of a coil 91, a capacitor 92, a PIN diode 93, and a DC cutoff filtering capacitor 94, and a transmission side switching circuit 9b consisting of a coil 95, a PIN diode 97, a coil 98, and a PIN diode 96, and a DC cutoff filtering capacitor 99. The coil 98 is supplied with a switching signal $SW_1$ from the T/R control circuit 1. When the switching signal $SW_1$ is 5 VDC in the transmission mode, the diode 96 in the transmission side switching circuit 9b becomes conductive, and thus a transmission signal from the HPA 32 is output to the antenna 5 through the bandpass filter 8. The DC cutoff filtering capacitor 99 rejects the 5 VDC of the switching signal $SW_1$. Conversely, when the switching signal $SW_1$ is 0 VDC in the reception mode, a reception signal from the antenna 5 is supplied to the LNA 41 through the bandpass filter 8 and the reception side switching circuit 9a. Namely, either the reception side switching circuit 9a or the transmission side switching circuit 9b becomes conductive in response to the switching signal $SW_1$ of 0 VDC or 5 VDC.

The bandpass filter 8 is ladder-constructed by a capacitor 85 and a coil 82, a capacitor 84 and a coil 81, and a capacitor 83. The bandpass filter 8 rejects signals having frequencies outside the frequency f. Note, the frequency f is 400 MHz+21.7 MHz.

In the transmission mode, the voice coder 103 receives a natural voice from the microphone 101, and encodes that voice into a digital signal S102 of 16 kbps (kilo bits per second), which is divided into a plurality of frames, as shown in FIG. 8a. The propagation speed of the coded signal S102 is raised two-fold (double), i.e., becomes 32 kbps. The speed-converted signal S103 is modulated at the modulation unit 10 to output a modulated voice signal S11 having an intermediate frequency $f_{IF}=21.7$ MHz. The oscillator 12 outputs a oscillation signal having the frequency $f_{IF}=21.7$ MHz. The modulated signal S11 is raised to 421.7 MHz at the frequency converter 31. The LOC 7 supplies an oscillation signal having an oscillation frequency $f_{LO}=400$ MHz. The raised signal S31 is amplified by the HPA 32 having a gain of 10 dBw. The raised and amplified signal S32 is transmitted from the antenna 5 to the band set through the switching circuit 9 and the bandpass filter 8.

In the reception mode, a reception signal having a frequency f=421.7 MHz is supplied from the antenna 5 to the LNA 41 having a gain of 20 dB, through the bandpass filter 8 and the switching circuit 9, and amplified thereat. The amplified reception signal S41 is lowered at the frequency converter 42. The lowered signal S42 has a frequency $f_{IF}=21.7$ MHz. The lowered signal S42 is demodulated at the demodulation unit 20 and supplied to the speed converter 201. The demodulated signal S21 has a bit rate of 32 kbps as shown in FIG. 9a, and is reduced to 16 kbps as shown in FIG. 9b. The lowered digital signal S201 is decoded at the voice decoder 202 and output as a natural voice from the speaker 203.

Even though the time division of the transmission and reception is needed when using a single frequency f to achieve a semi two-way communication, by providing the speed converters 103 and 201, a propagation speed of the signals between the base telephone portion and the hand set is substantially the same as that of the prior art.

Figure 10:
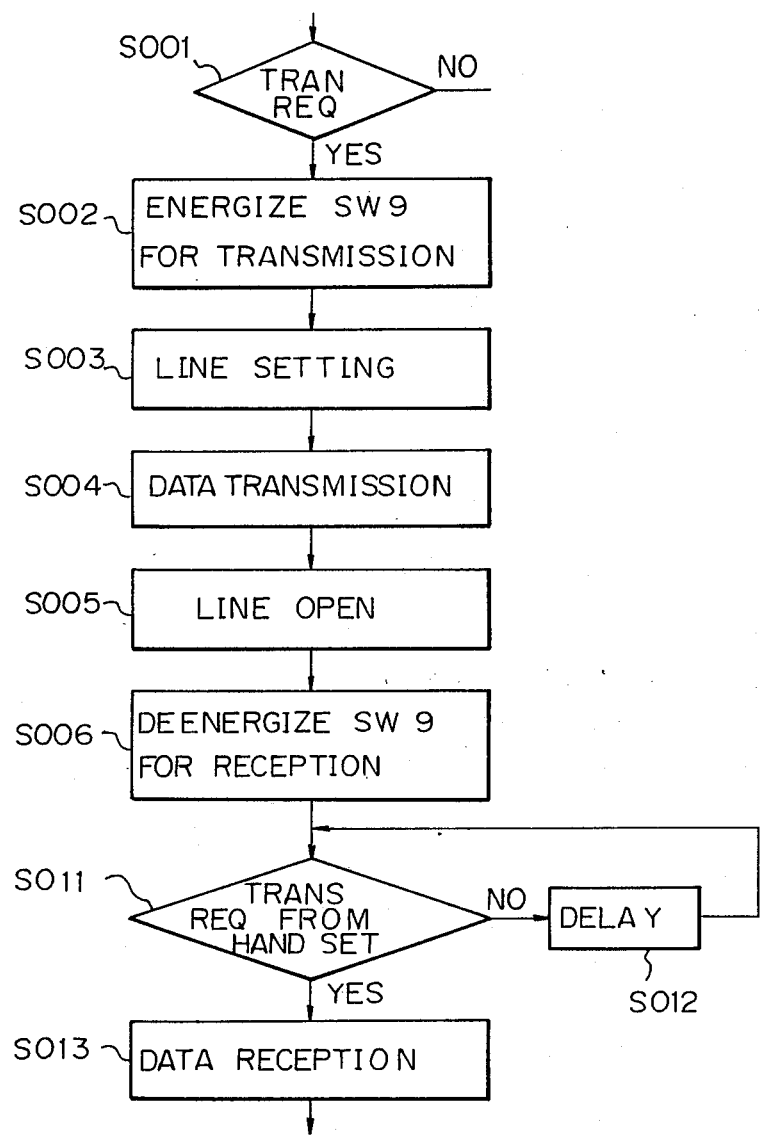
FIG. 10 is a flow chart of the operation of a transmission and reception (T/R) control unit shown in FIG. 6.

The T/R control unit 1 controls the above operation. FIG. 10 is a flowchart of the operation of the T/R control unit 1. The T/R control unit 1 may include a microprocessor unit (MPU). At step 001 (S001), the T/R control unit 1 checks whether or not the transmission request exist. If so, at step 002 (S002), the T/R control unit 1 outputs a switching signal $SW_1$ of 5 VDC to energize the switching circuit 9 for transmission so that the state of the switching circuit 9 becomes as shown by the solid line in FIG. 6. Thereafter, at step 003 (S003), the T/R control unit 1 sets a transmission line. Accordingly, at step 004 (S004), the data transmission can be carried out. Thereafter, at step 005 (J005), the T/R control unit 1 opens the transmission line for reception. At step 006 (S006), the T/R control unit 1 outputs the switching signal $SW_1$ of 0 VDC to deenergize the switching circuit 9 as shown by the dotted line in FIG. 6. The above operation corresponds to the transmission at the time $t_1$ shown in FIG. 5.

Thereafter, the T/R control unit 1 sets the reception mode. The T/R control unit 1 detects a transmission request from the hand set (S011), or waits until the transmission request is issued from the hand set (S012). When the transmission request is detected, the data reception is carried out (S013). This operation corresponds to the reception at the time $t_2$ shown in FIG. 5.

The above transmission and reception is continued until the telephone conversation is terminated.

As described above, the transmission and the reception do not arise simultaneously. Accordingly, the reception system is not affected by the high level signal S32, and thus electromagnetic shielding is not needed. Also, the reception filter and the transmission filter as shown in FIG. 2 are not provided, since the switching circuit 9 separates the transmission signal and the reception signal.

A modification of a circuit of the base telephone portion and the hand set shown in FIG. 6 will be described with reference to FIG. 11.

Figure 11:
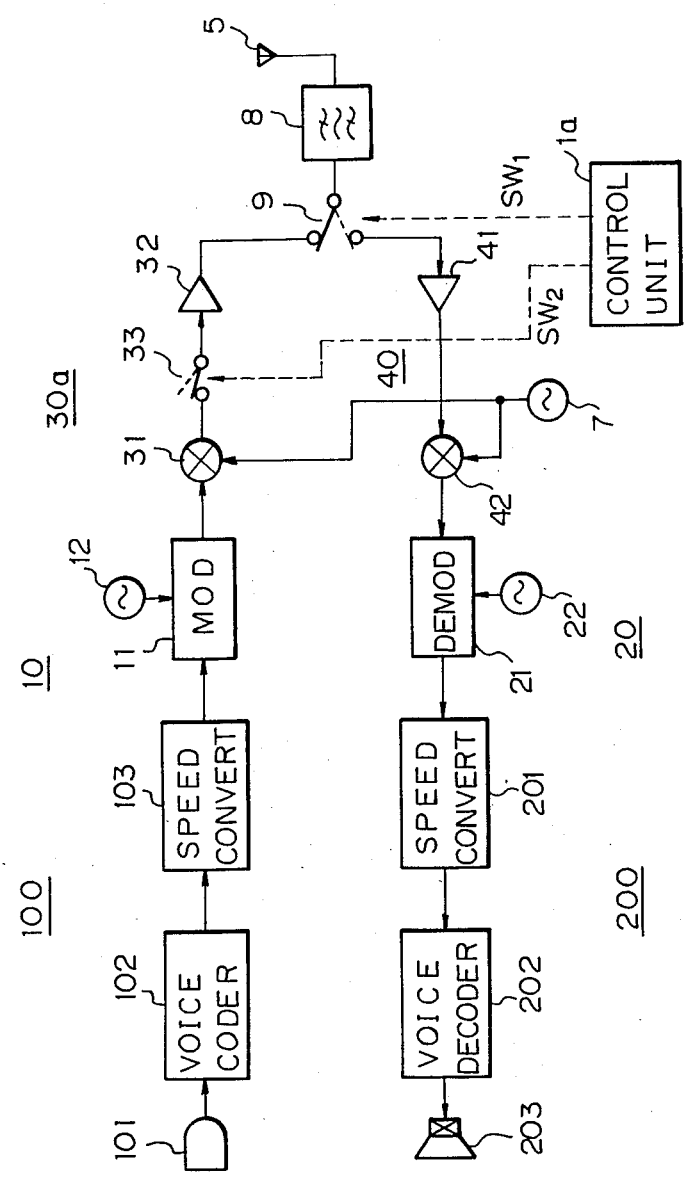
FIG. 11 is a circuit diagram of a modification of the radio station in FIG. 6.

In FIG. 11, another switching circuit 33 is provided between the frequency converter 31 and the HPA 32. In FIG. 6, a leakage signal which may be output from the frequency converter 31 can be amplified to a relatively high level signal at the HPA 32 since the HPA 32 has a high gain. The amplified leakage signal as noise may generate spurious noise in the reception system The circuit shown in FIG. 11 is intended to eliminate the above adverse effect by providing the switching circuit 33. The switching circuit 33 can be a simple switching element, such as a transistor. The T/R control unit 1a outputs a high level switching signal $SW_2$ to close the switching circuit 33 as shown by the solid line, when in the transmission mode. Conversely, the T/R control unit 1a outputs a low level switching signal $SW_2$ to open the switching circuit 33 as shown by a dotted line, when in the reception mode, thereby preventing leakage or the application of a low level signal to the HPA 32.

In the above embodiments described with reference to FIGS. 6 and 11, a recovery clock is used in the same way as a transmission clock. In addition, the base telephone portion and the hand set are at the same level. Namely, if the base telephone portion initiates transmission to the hand set, the hand set is placed in the reception mode, or, vice versa. There is no master and slave relationship therebetween.

A second embodiment of the present invention is described below with reference to FIG. 12, and is a digital two-way radio communication system in which a recovery clock from the transmitter is used.

Figure 12:
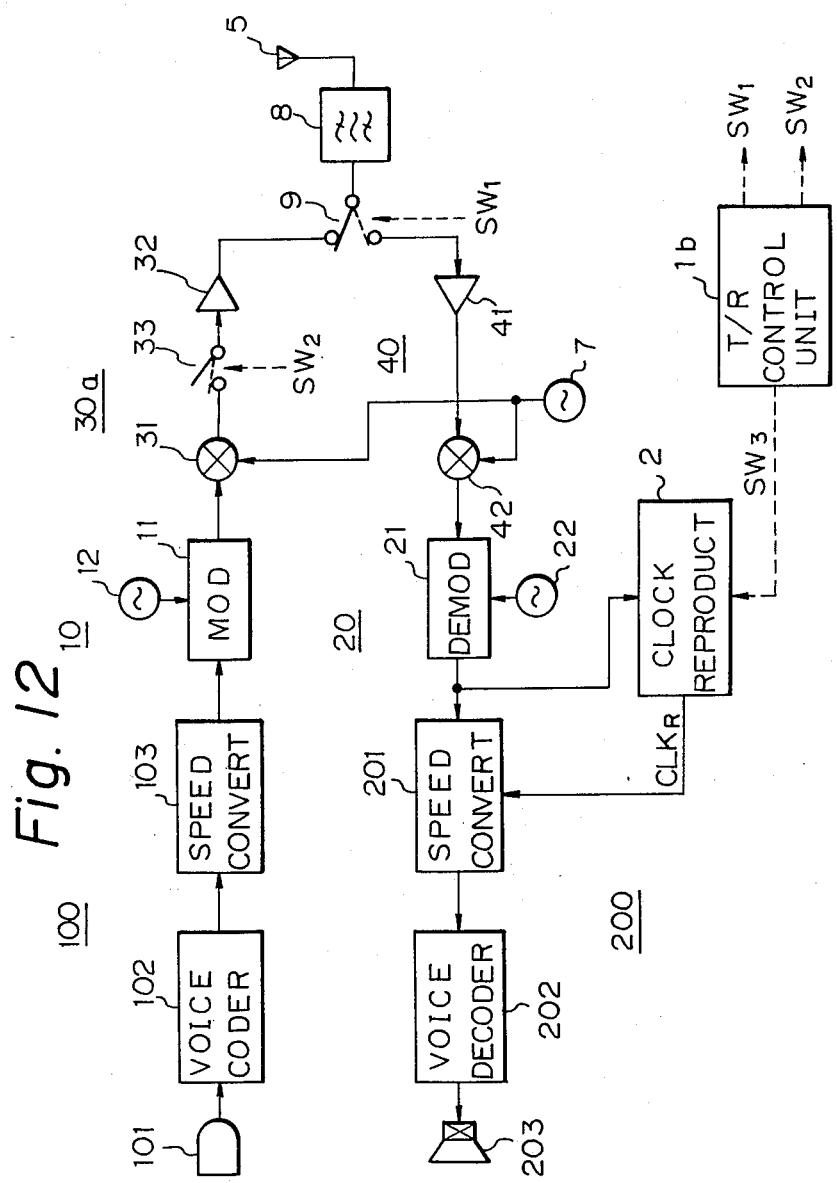
FIG. 12 is a circuit diagram of a second embodiment of a radio station in accordance with the present invention.
Figure 13:
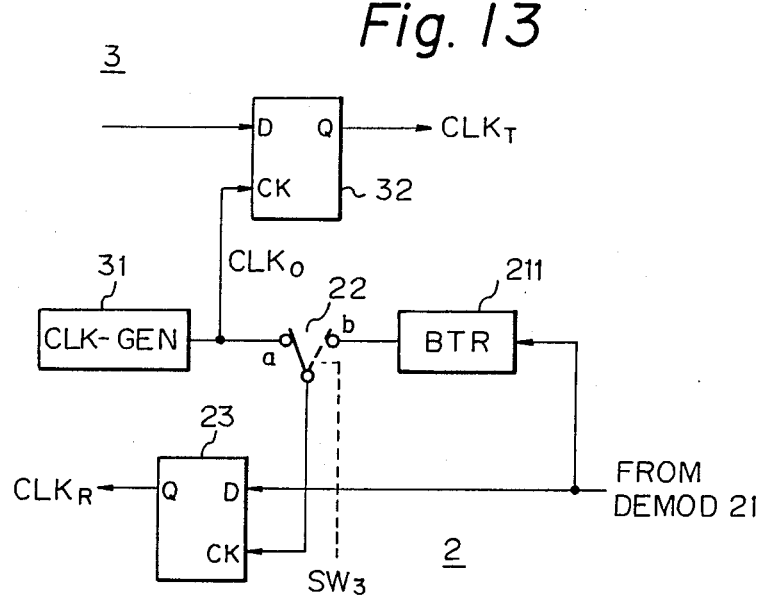
FIG. 13 is a circuit diagram of a clock reproduction circuit shown in FIG. 12.

In FIG. 12, a clock reproduction circuit 2 is provided in addition to the circuit shown in FIG. 11. FIG. 13 shows a circuit diagram of the clock reproduction circuit 2, and a transmission clock source circuit 3. The clock reproduction circuit 2 includes a bit timing recovery circuit (BTR) 211, a switch 22, and a delay-type flip-flop (D-FF) 23. The transmission clock source circuit 3 includes a source clock generator 31 generating a source clock $CLK_0$ and a D-FF 32. The BTR 211 receives a reception signal and extracts a reception clock.

When the master station transmits data to the slave station, a T/R control unit 1b in the master station outputs a switching signal $SW_3$ to the switch 22 to bring the switch 22 in the closed state as shown by a solid line. On the contrary, a T/R control unit (not shown) in the slave station outputs another switch signal corresponding to the switch signal $SW_3$ to another switch corresponding to the switch 22 to bring the other switch into the open state. Accordingly, the reception and the transmission of the slave station is controlled by a clock transmitted from the master station. Also, in the master station, the reception is carried out by the clock therein. More specifically, the clock $CLK_0$ from the clock generator 31 is supplied to the speed converter 201 through the D-FF 23 as a recovery clock $CLK_R$. The speed conversion is carried out by using this recovery clock $CLK_R$. Conversely, when a first transmission is carried out by the slave station, the transmission and the reception in the master station and the reception in the slave station are made by using a clock of the slave station.

The above embodiment improves the stability of the data communication, since synchronization is achieved.

The above embodiment can be applied to digital two-way radio communication systems in which a distance between the master station and the slave station is within a predetermined range, defined by one bit transmission tolerance. When the bit rate is 48 kbps, the time for a one bit transmission is 20.8 $\mu$s. Accordingly, the above distance is up to 6.24 km/2=3.12 km. Practically, the distance may be less than 1.5 km.

A third embodiment of the digital two-way radio communication system, described with reference to FIG. 14, is intended to expand the above distance.

In FIG. 14, a first radio station includes a voice signal generation unit 100a, a transmission and reception (T/R) control unit 1c, the modulation unit 10, the transmission unit 30a, the switching circuit 9, the bandpass filter 8, and the antenna 5. The first radio station also includes the reception unit 40, the demodulation unit 20, the local oscillator 7, a clock reproduction unit 2a, and a voice signal reproduction unit 200a.

A second radio station in radio-communication with the first radio station can be constructed in the same way as the first radio station.

The T/R control unit 1c includes, a supervisory portion 110, a speed converter 111 similar to the speed converter 103 shown in FIGS. 6 and 10, a control data insertion circuit 112, a control data extraction circuit 113, and a speed converter 114 similar to the speed converter 201 shown in FIGS. 6 and 10. The T/R control unit 1c can be realized by a microprocessor unit (MPU).

The voice signal generation unit 100a consists of the microphone 101 and the voice coder 102. The voice signal generation unit 100a and the speed converter 111 cooperate to function as the voice signal generation unit 100 shown in FIG. 6, the function of which is described with reference to FIGS. 8a and 8b. The voice signal reproduction unit 200a consists of the voice decoder 202 and the speaker 203. The voice signal reproduction unit 200a and the speed converter 114 also cooperate to function as the voice signal generation unit 200 shown in FIG. 6, the function of which is described with reference to FIGS. 9a and 9b.

The modulation unit 10, the transmission unit 30a, the switching circuit 9, the bandpass filter 8, the antenna 5, the reception unit 40, the LOC 7, and the demodulation unit 20 are substantially the same as those in FIG. 6.

Figure 15:
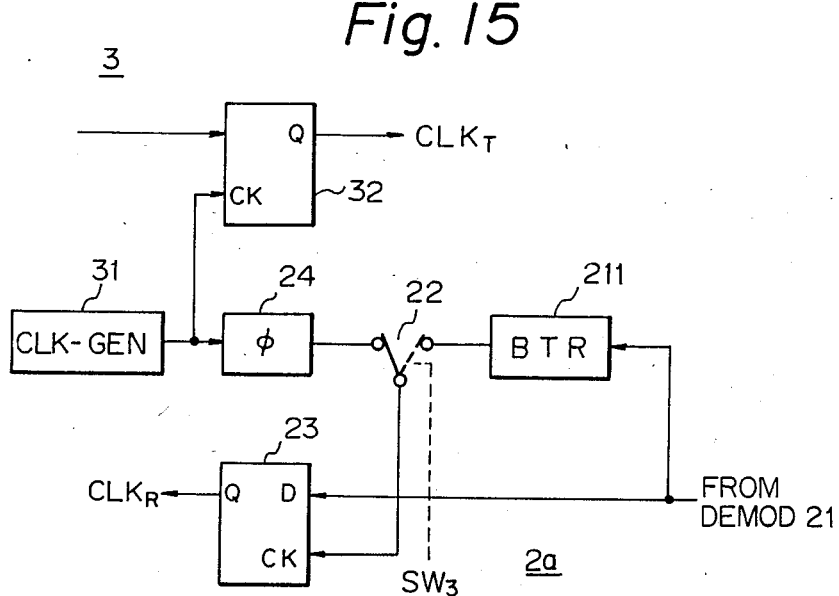
FIG. 15 is a circuit diagram of a clock reproduction circuit shown in FIG. 14.

The clock reproduction circuit 2a shown in FIG. 15 includes a phase shifter 24 in addition to the clock reproduction circuit 2 shown in FIG. 13.

Figure 16:
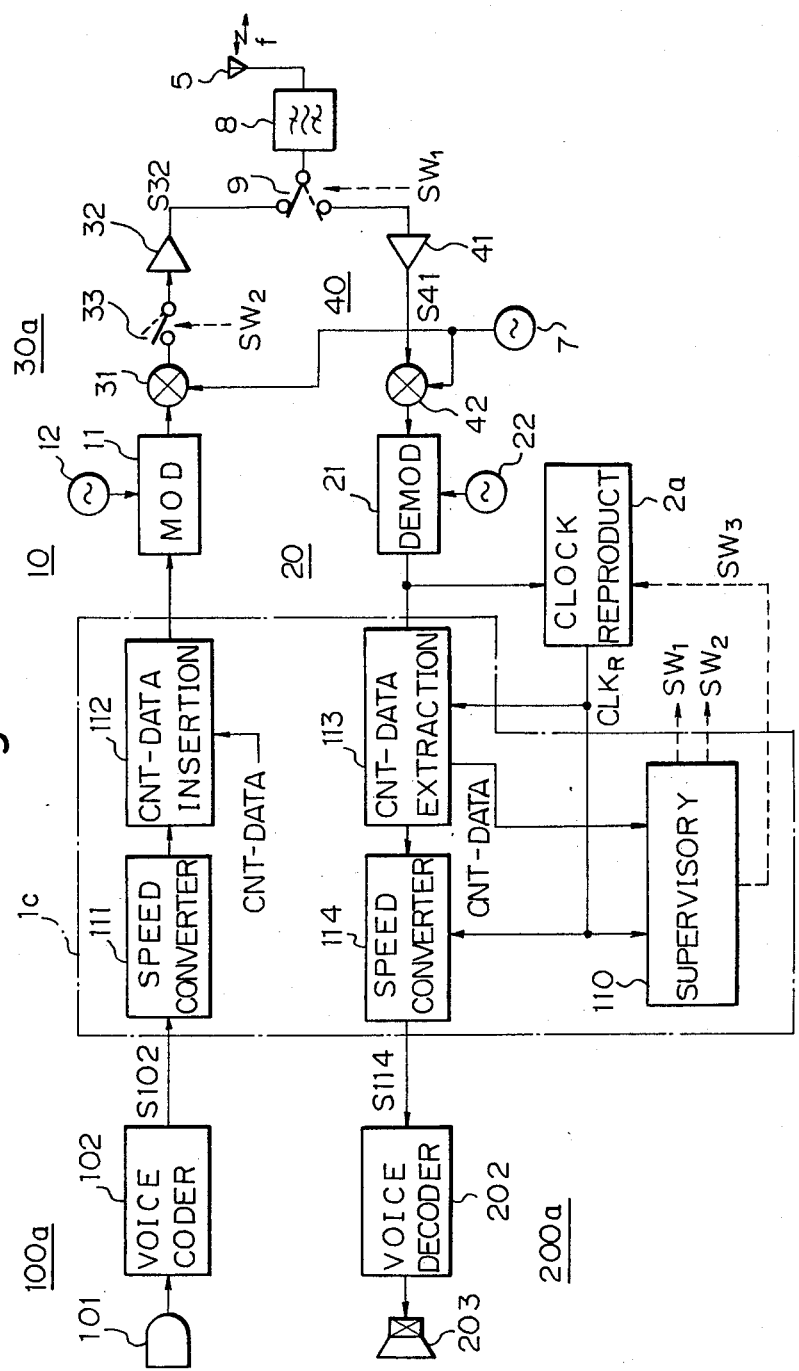
FIGS. 16a to 16c are graphs of transmission and reception data formats for the circuit shown in FIG. 14.

FIGS. 16a to 16c are data formats of the signal S102 from the voice coder 102, the signal S32 from the HPA 32, the signal S41 from the LNA 41, and the signal S114 from the speed converter 114. The reception signal S41 consists of guard-bits G-B, control data CNT-DATA, and reception data R-DATA. Also, the transmission signal S32 consists of control data CNT-DATA and transmission data T-DATA. FIG. 17 is a data format of the control data. The control data consists of dotting pattern DP and a unique word UW. The dotting pattern is provided for showing the unique word, and is formed by binary data of "1010—10". The unique word UW represents an identification code of the master station or the slave station, and the timing.

The speed converter 111 raises the bit rate of the signal S102 by approximately 2.5 times. This speed conversion is higher than that of the speed converter 103 shown in FIG. 6, since the control signal is inserted into the transmission signal. The control data insertion circuit 112 adds the control data CNT-DATA to the speed-converted transmission data T-DATA. A transmission burst T-BURST consisting of the control data CNT-DATA and the transmission data T-DATA is output from the antenna 5. Also, the reception signal consisting of the guard bit G-B and a reception burst R-BURST composed of the control signal CNT-DATA and the reception data R-DATA is supplied to the control data extraction circuit 113 and the control data CNT-DATA is extracted thereat. The extracted control data CNT-DATA is supplied to the supervisory portion 110. The speed converter 114 reduces the bit rate of the reception data R-DATA by 2.5 times. The reduced signal S114 is supplied to the voice decoder 202 to output a natural voice through the speaker 203.

Figure 18:
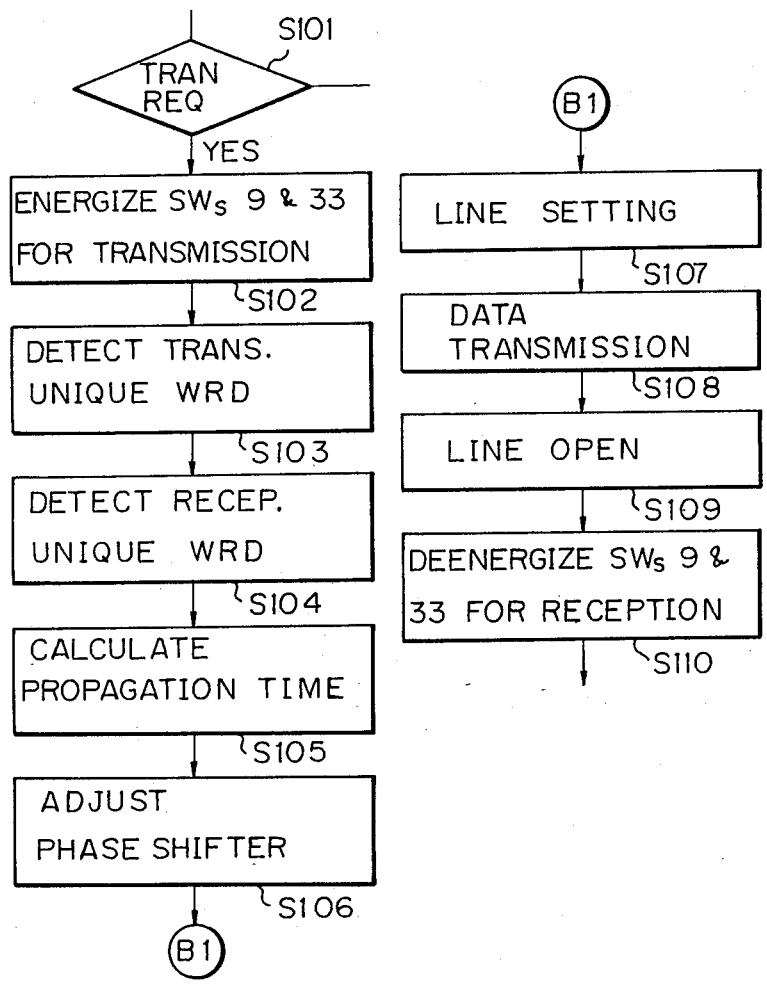
FIG. 18 is a flow chart explaining the operation of a T/R control unit shown in FIG. 14.

As shown in FIG. 18, when a transmission request exists (S101), the supervisory portion 110 energizes the switch circuit 9 and the switch 33 by outputting the switching signals SW$_1$ and SW$_2$ to bring them into the closed state as shown by solid lines (S102). The supervisory portion 110 detects the positions of the transmitted unique word output from the master station and the received unique word (S103, S104) output from the slave station, and calculates a propagation time between the master station and the slave station (S105). The supervisory portion 110 determines a bit length of the guard bits on the basis of the propagation time. The bit length of the guard bits is defined by the propagation time in this way. The guard bits are provided to protect the control data CNT-DATA and the reception data R-DATA. The guard bits, per se, are zero. The supervisory portion 110 controls the phase shifter 24 shown in FIG. 15 to adjust the clock therefrom to the bit length of the guard bits (S106). Thereafter, the transmission is carried out (S107 to S109).

According to the above embodiment, a distance between the master station and the slave station can be expanded. And, an optimum communication over an arbitrary distance can be realized.

A fourth embodiment of the present invention will be described with reference to FIG. 19.

Figure 19:
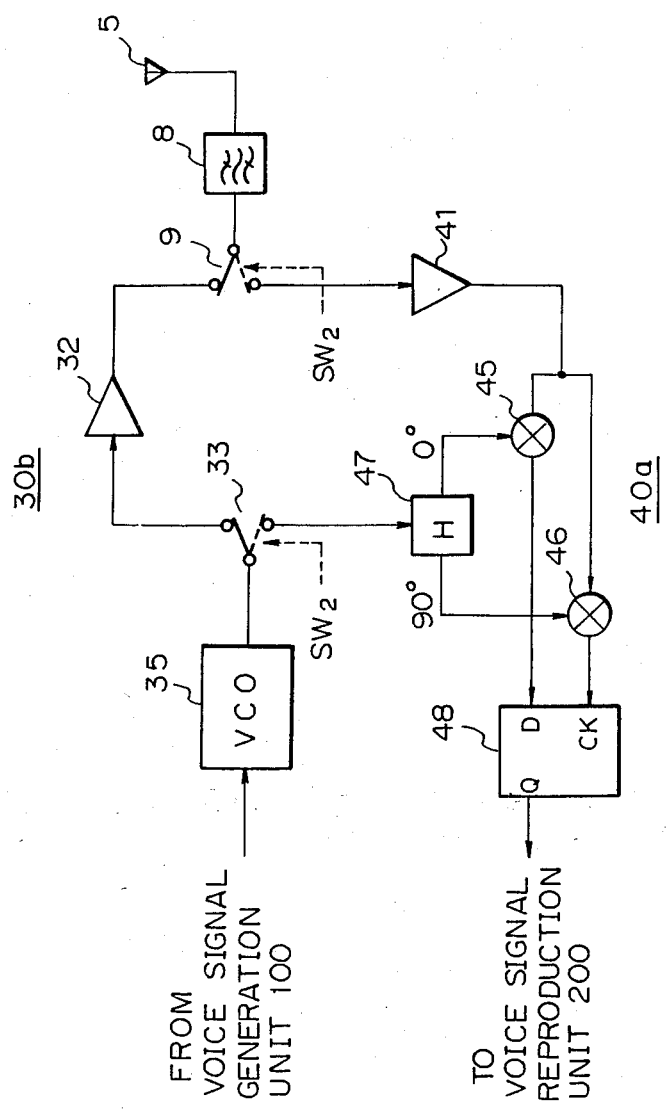
FIG. 19 is a circuit diagram of a fourth embodiment of a radio station in accordance with the present invention.

The circuit of FIG. 19 is a modification of the circuit of FIG. 11. In FIG. 19, a voltage controlled oscillator (VCO) 10a is provided instead of the frequency converter 31. A reception circuit 40a is provided instead of the reception circuit 40. The reception circuit 40a includes a hybrid circuit 47, mixers 45 and 46 and a D-FF 48 in addition to the LNA 41. The VCO 35 acts as a frequency shift keying (FSK) direct modulation oscillator. The reception circuit 40a acts as a FSK direct conversion receiver.

When the transmission mode is selected, the switches 33 and 9 are energized, as shown by solid lines, by the T/R control unit 1a. The VCO 35 oscillates at the frequency f when the reception mode is selected, when in the transmission mode, the VCO 35 generates a signal by a FSK-modulation in response to the transmission data. The FSK-modulated signal is transmitted through the switch 33, the HPA 32, the switch circuit 9, the bandpass filter 8, and the antenna 5.

When the reception mode is selected, the switches 33 and 9 are deenergized, as shown by dotted lines, by the T/R control unit. The reception signal is supplied to the reception circuit 40a. As the VCO 35 is in a non-modulation state, a carrier of the VCO 35 is supplied to the hybrid 7 through the switch 33. The carrier is divided into an I channel signal having phase of 0° and a Q channel signal having phase of 90° at the hybrid 34. The I channel signal is supplied to the mixer 45 to be used for the frequency conversion of the reception signal from the LNA 41. The Q channel signal is also supplied to the mixer 46 to be used for the frequency conversion of the reception signal. An output signal from the mixer 45 is supplied to a delay (D) input terminal of the D-FF 48 and sampled by an output signal from the mixer 46 which is supplied to a clock (CK) input terminal of the D-FF 48. As a result, a reproduction data of a base band is output from an output terminal Q of the D-FF 48. Here, the D-FF 48 acts as a discriminator.

As described above, in the reception mode, the carrier of the VCO 35 as the FSK direct modulation oscillator is used to carry out the FSK direct conversion reception at the reception circuit 40a, i.e., the oscillator is commonly used for both transmission and reception, a circuit construction is further simplified. In addition, since oscillators, which may affect the reception side in the reception mode, are not provided, there is no interferences between the transmission side and the reception side in the radio station, even when the HPA 32 is provided, and thus no shielding is required between the transmission side and the reception side. As a result, the radio station can be formed small, light and low cost.

Many widely different embodiments of the present invention may be constructed without departing from the spirit and scope of the present invention, and it should be understood that the present invention is not restricted to the specific embodiments described above, except as defined in the appended claims.

We claim:

1. A digital two-way radio communication system comprising:
  a first radio station including:
    a first antenna;
    first data transmission means;
    first data reception means including a first clock reproduction circuit for supplying a first clock for recovering a first reception signal, said first clock being generated by a first local clock generator when said first radio station initiates a data transmission;
    first switching means provided between said first antenna, said first data reception means and said first data transmission means to form one of a first transmission path between said first data transmission means and said first antenna and a first reception path between said first antenna and said first data reception means;
    first voice signal generation means, operatively connected to said first data transmission means, for supplying a first voice signal to said first data transmission means;
    first voice signal reproduction means, operatively connected to said first data reception means, for reproducing a second voice signal;
    first speed converter means, operatively connected between said first voice signal generation means and said first data transmission means, for receiving said first voice signal, converting said first voice signal into a digital signal, and raising the bit rate of said first voice digital signal from said first data transmission means by at least two times; and
    second speed converter means, operatively connected between said first data reception means and said first voice signal reproduction means, for lowering the bit rate of said first voice digital signal from said first data reception means by at least half speed;
  a second radio station including:
    a second antenna;
    second data transmission means;
    second data reception means, including a second clock reproduction circuit for supplying a second clock for recovering the reception signal, said second clock being reproduced from said second data reception means output when said first radio station initiates a data transmission and generated by a second local clock generator when said second radio station initiates a data transmission;
    third speed converter means, operatively connected between said second voice signal generation means and said second data transmission means, for receiving said second voice signal, converting said second voice signal into a digital signal and for raising the bit rate of said second voice digital signal from said second data transmission means by at least two times;
    fourth speed converter means, operatively connected between said second data reception means and said second voice signal reproduction means, for lowering the bit rate of said second voice digital signal from said second data reception means by at least half speed;
    second switching means provided between said second antenna, said second data reception means and said second data transmission means to form one of a second transmission path between said second data transmission means and said second antenna, and a second reception path between said second antenna and said second data reception means,
  said first and second radio stations being radio-connected by passing a single frequency through said first and second antennas,
  when said first data transmission means transmits data to said second radio station through said first antenna, said first switching means forming said first transmission path, and said second switching means forming said second reception path, and
  when said second data transmission means transmits data to said first radio station through said second antenna, said second switching means forming said second transmission path, and said first switching means forming said first reception path;
    second voice signal generation means, operatively connected to said second data transmission means, for supplying said second voice signal to said second data transmission means; and second voice signal reproduction means, operatively connected to said second data reception means, for reproducing said first voice signal from said first radio station;

said first and second voice signal generation means each comprising:
a microphone; and
a voice coder connected to said microphone; and said first and second voice signal reproduction means each comprising:
a voice decoder; and
a speaker connected to said voice decoder.

2. A digital two-way radio communication system according to claim 1, wherein each of said first and second transmission means comprises:
a modulation unit; and
a transmission unit, connected to said modulation unit, including a high power amplifier for amplifying the transmission signal to a level required for transmission, and wherein each of said first and second reception means comprises:
a reception unit including a low noise amplifier for amplifying the reception signal to a level required for recovery; and
a demodulation unit connected to said low noise amplifier.

3. A digital two-way radio communication system according to claim 2, wherein each of said transmission units comprises a switch circuit, connected to said high power amplifier, for supplying the transmission signal to said high power amplifier during the transmission mode and for not supplying the transmission signal to said high power amplifier during the reception mode.

4. A digital two-way radio communication system according to claim 2, wherein each of said first and second radio stations comprises a local frequency oscillator generating a signal having a local frequency adjacent to a frequency for radio communication,
wherein each modulation unit comprises:
a first oscillator generating a signal having an intermediate frequency; and
a modulator, connected between said first oscillator and said modulation unit, for receiving a source transmission signal and said intermediate frequency signal from said first oscillator, and for modulating said source transmission signal by said intermediate frequency signal, and
wherein each transmission unit comprises a first frequency converter, connected to said modulation unit and said local frequency oscillator, for receiving said modulated transmission signal and said local frequency signal from said local frequency oscillator, and for raising said modulated transmission signal to said frequency for radio communication,
wherein each reception unit comprises a second frequency converter, connected to said low noise amplifier and said local frequency oscillator, for receiving said reception signal amplified at said low noise amplifier and said local frequency signal, and for lowering said reception signal to said intermediate frequency, and
wherein each demodulation unit comprises:
a second oscillator generating a signal having a frequency equal to that of said first oscillator; and
a demodulator, connected to said second oscillator, for receiving said lowered reception signal and said frequency signal from said second oscillator, and for demodulating said lowered reception signal by said frequency signal.

5. A digital two-way radio communication system according to claim 1, wherein each of said first and second transmission means comprises control data insertion means for adding a control data comprising a first unique data representing an identification of the transmitted radio station and a transmitted timing before the transmission data,
wherein each of said first and second reception means comprises control data extraction means for extracting another control data comprising a second unique data included in the reception signal by said clock from said clock reproduction circuit,
wherein each said clock reproduction circuit includes means for phase-shifting a clock from said clock reproduction circuit, and
wherein each of said first and second radio stations comprises means, connected to said control data extraction means and said means for phase-shifting, for calculating a propagation time between said first and second radio stations by comparing said first unique data and said second unique data, for controlling said phase-shifting means in response to the calculated propagation time, and for adding a guard bit defined by the calculated propagation time to an end of the transmission data.

6. A digital two-way radio communication system according to claim 1, wherein each of said first and second data transmission means comprises:
means for direct frequency-shift-keying (FSK) transmission data;
switching means connected to means for said direct frequency-shift-keying; and
a high power amplifier coupled to said switching means, and
wherein each of said first and second data reception means comprises means, coupled to said switching means, for recovering a reception data by a FSK conversion,
said direct FSK means generating a signal having a frequency corresponding to said transmission data in the transmission mode, and generating another signal having a carrier frequency, and
said switching means connecting between said direct FSK means and said high power amplifier during the transmission mode, and supplying said carrier signal from said direct FSK means to said FSK recovering means during the reception mode, to recover the reception signal.

7. A digital two-way radio communication system according to claim 6, wherein said direct FSK means comprises a voltage controlled oscillator.

8. A digital two-way radio communication system according to claim 6, wherein said FSK recovering means comprises:
a hybrid, connected to said switching means, for receiving said carrier signal and outputting a first phase signal and a second phase signal, said phase signals having a phase difference of 90°;
a first mixer, connected to said hybrid, for mixing the reception signal with said first phase signal;

a second mixer, connected to said hybrid, for mixing the reception signal with said second phase signal; and a discriminator, connected to said first and second mixers, for discriminating the reception signal in accordance with outputs from said first and second mixers.

9. A digital two-way radio communication system according to claim 1, wherein said first radio station comprises a first bandpass filter connected between said first switching means and said first antenna, and said second radio station comprises a second bandpass filter connected between said second switching means and said second antenna, said first and second bandpass filters having characteristic filtering signals having frequencies outside of said frequency used for radio communication.

* * * * *